(12) United States Patent  (10) Patent No.: US 8,935,088 B2
Matsubara                    (45) Date of Patent: Jan. 13, 2015

(54) DRIVING ASSISTANCE SYSTEM FOR VEHICLE

(75) Inventor: Toshiyuki Matsubara, Gotenba (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/349,200

(22) PCT Filed: Oct. 3, 2011

(86) PCT No.: PCT/JP2011/072766
§ 371 (c)(1),
(2), (4) Date: Apr. 2, 2014

(87) PCT Pub. No.: WO2013/051083
PCT Pub. Date: Apr. 11, 2013

(65) Prior Publication Data
US 2014/0244142 A1   Aug. 28, 2014

(51) Int. Cl.
*B60W 30/095* (2012.01)
*G08G 1/16* (2006.01)
(Continued)

(52) U.S. Cl.
CPC .............. *B60W 30/08* (2013.01); *G08G 1/16* (2013.01); *B60W 30/095* (2013.01); *G08G 1/165* (2013.01); *B62D 15/0265* (2013.01); *B62D 6/002* (2013.01); *B62D 6/04* (2013.01);
(Continued)

(58) Field of Classification Search
CPC .............. B60W 30/08; B60W 30/095; B60W 30/0953; G08G 1/16; G08G 1/165; B62D 6/002; B62D 15/0265; B62D 6/04

USPC ......... 701/41, 116, 300, 301; 340/435, 995.1, 340/995.14, 995.17, 995.25; 348/119; 180/280

See application file for complete search history.

(56) References Cited

U.S. PATENT DOCUMENTS 7,382,913 B2 * 6/2008 Dorranc et al. ............... 382/151
2009/0228174 A1 * 9/2009 Takagi et al. ................... 701/41
(Continued)

FOREIGN PATENT DOCUMENTS

JP   2007-204044 A   8/2007
JP   2011-236814 A   11/2011
WO  2013/051082 A1   4/2013

*Primary Examiner* — Russell Frejd
(74) *Attorney, Agent, or Firm* — Kenyon & Kenyon LLP

(57) ABSTRACT

An object is to prevent a driving assistance system for a vehicle from causing a collision of the driver's own vehicle with a solid object by performing driving assistance. To achieve the object, when a solid object that can be an obstacle exists in the course of the driver's own vehicle, the driving assistance system for a vehicle according to the present invention determines a plurality of primary paths along which the driver's own vehicle can travel by changing the momentum thereof, designates an avoidance line along which the solid object can be avoided from among the primary paths, and changes the momentum of the driver's own vehicle in such a way that the driver's own vehicle travels along the selected avoidance line. If the plurality of primary lines do not include an avoidance line, the driving assistance system sets a divergent point in the middle of the primary paths and determines a plurality of secondary paths along which the driver's own vehicle can travel by changing the momentum of the driver's own vehicle at the diverging point. Then, the driving assistance system selects an avoidance line from among the plurality of secondary paths.

5 Claims, 14 Drawing Sheets

(51) Int. Cl.
  *B62D 6/04* (2006.01)
  *B60W 30/08* (2012.01)
  *B62D 15/02* (2006.01)
  *B60W 10/184* (2012.01)
  *B60W 10/20* (2006.01)
  *B60W 30/09* (2012.01)
  *B62D 6/00* (2006.01)

(52) U.S. Cl.
  CPC ............ *B60W 10/184* (2013.01); *B60W 10/20* (2013.01); *B60W 30/09* (2013.01); *B60W 30/0956* (2013.01)
  USPC ............. 701/301; 701/41; 701/116; 340/435; 340/995.14; 340/995.17; 340/995.25; 348/119; 180/280

(56) References Cited

U.S. PATENT DOCUMENTS

| | | | |
|---|---|---|---|
| 2009/0265070 A1* | 10/2009 | Okada et al. | 701/70 |
| 2010/0030426 A1* | 2/2010 | Okita | 701/41 |
| 2010/0235035 A1* | 9/2010 | Nishira et al. | 701/29 |
| 2011/0022317 A1* | 1/2011 | Okita | 701/301 |
| 2014/0244151 A1 | 8/2014 | Matsubara et al. | |

* cited by examiner

DRIVING ASSISTANCE SYSTEM FOR VEHICLE

CROSS-REFERENCE TO RELATED APPLICATIONS

This is a national phase application based on the PCT International Patent Application No. PCT/JP2011/072766 filed Oct. 3, 2011, the entire contents of which are incorporated herein by reference.

TECHNICAL FIELD

The present invention relates to technologies of providing driving assistance for avoiding a solid object existing in the course of the driver's own vehicle.

BACKGROUND ART

There has been developed heretofore driving assistance systems that detect a solid object existing in front of the driver's own vehicle and, if a collision of the driver's own vehicle with the detected solid object is predicted to occur, warns the driver or automatically performs driving operations for avoiding a collision of the driver's own vehicle with the solid object.

In a known technology pertaining to the driving assistance system as described above, a solid object existing around the driver's own vehicle is detected using a camera, a laser radar, or the like, and assistance for steering and/or braking operation is performed based on the degree of risk determined in relation to the type of the solid object and the time to collision (TTC) (see, for example, Patent Document 1).

PRIOR ART DOCUMENTS

Patent Documents

Patent Document 1: Japanese Patent Application Laid-Open No. 2007-204044

DISCLOSURE OF THE INVENTION

Problem to be Solved by the Invention

In the method of the above-described prior art, it is necessary to calculate the degree of risk in regard to the longitudinal direction (or front-rear direction) of the vehicle and the lateral (or left-right) direction of the vehicle for all of the obstacles existing around the driver's own vehicle. Therefore, if driving assistance for avoiding a solid object existing in the course of the driver's own vehicle and then avoiding another solid object is to be performed, the computational load on the driving assistance system can be high.

The present invention has been made in view of the above described circumstances, and an object of the present invention is to provide a technology that enables a driving assistance system that performs driving assistance for avoiding a solid object existing in the course of the driver's own vehicle to perform effective driving assistance while keeping the load on the driving assistance system low.

Means for Solving the Problem

To achieve the object, when a solid object that can be an obstacle exists in the course of the driver's own vehicle, the driving assistance system for a vehicle according to the present invention determines a plurality of primary paths along which the driver's own vehicle can travel by changing the momentum thereof, designates an avoidance line along which the solid object can be avoided from among the primary paths, and changes the momentum of the driver's own vehicle in such a way that the driver's own vehicle travels along the selected avoidance line. If the plurality of primary lines do not include an avoidance line, the driving assistance system sets a divergent point in the middle of the primary paths at which the momentum of the driver's own vehicle it to be changed again and determines a plurality of secondary paths along which the driver's own vehicle can travel by changing the momentum of the driver's own vehicle at the diverging point. Then, the driving assistance system selects an avoidance line from among the plurality of secondary paths.

Specifically, the driving assistance system for a vehicle according to the present invention comprises:

recognition means for recognizing a solid object existing in the surrounding of a driver's own vehicle and generating information about a relative position of the solid object and the driver's own vehicle;

setting means for setting a grid map representing relative positions of the present location of the driver's own vehicle, an avoidance area, a safe area, and an unknown area on the basis of the information generated by said recognition means, the avoidance area being an area in which a solid object exists, the safe area being an area in which no solid object exists, and the unknown area being an area in which it is not known whether a solid object exists or not; and assistance means for, when the course of the driver's own vehicle crosses said avoidance area in the grid map set by said setting means, determining a plurality of primary paths, designating an avoidance line from among the plurality of primary paths, and changing the momentum of the driver's own vehicle in such a way that the driver's own vehicle travels along the designated avoidance line, the primary paths being paths along which the driver's own vehicle can travel by changing the momentum of the driver's own vehicle, and the avoidance line being a path along which the avoidance area can be avoided, wherein when said plurality of primary paths do not include an avoidance line, said assistance means sets a diverging point in the middle of said primary paths at which the momentum of the driver's own vehicle is to be changed again, determines a plurality of secondary paths, and designates an avoidance line from among the plurality of secondary paths, the secondary paths being paths along which the driver's own vehicle can travel by changing the momentum of the driver's own vehicle at said diverging point.

The driving assistance system for a vehicle according to the present invention can set an avoidance line even when it is necessary to change the momentum of the driver's own vehicle multiple times in order to avoid the avoidance area, as is the case when there is a possibility that the driver's own vehicle avoids a solid object (which will be hereinafter referred to as the "first solid object") existing in the course of the driver's own vehicle and then collides with another solid object (which will be hereinafter referred to as the "second solid object"). For example, the driving assistance system can set an avoidance line that allows the driver's own vehicle to change its momentum again after avoiding the first solid object. Therefore, the driving assistance system can set an avoidance line along which both the first and second solid objects can be avoided.

The "momentum of the driver's vehicle" in the context of this specification is a momentum correlating with the turning energy of the vehicle, which may be, for example, the yaw rate or the lateral acceleration in the left-right direction of the vehicle. When determining the plurality of primary paths or the plurality of secondary paths, the assistance means may determine, as the primary paths or secondary paths, a plurality of paths along which the driver's own vehicle is predicted to travel when the steering angle of the vehicle is varied in the left and right directions in predetermined angular increments. The "predetermined angular increment" mentioned here may be equal to the smallest angle by which the assistance means can change the steering angle.

The driving assistance system for a vehicle according to the present invention may be adapted to determine the position of the diverging point in the primary paths using as a parameter a lateral distance, which is the distance between the primary paths and an avoidance area existing on either the left or right side of the primary paths. In other words, the driving assistance system for a vehicle according to the present invention may narrow down the range of the position of the diverging point set in the primary paths to one point using the lateral distance as a parameter.

In the case where diverging points are set at multiple points on the primary path, it is necessary to perform processing for determining secondary paths and processing for designating an avoidance line for each of the plurality of diverging points. This may lead to an increase in the load on the driving assistance system and an increase in the time taken until the avoidance line is designated.

Narrowing down the range of the position of the diverging point using the aforementioned lateral distance as a parameter can reduce the load on the driving assistance system and reduce the time taken the avoidance line is designated.

The driving assistance system according to the present invention may be adapted to calculate the amount of change in the lateral distance at successive points along a traveling direction of the driver's own vehicle and to set the diverging point at a point at which the amount of change is equal to or larger than a predetermined reference lateral distance.

According to this method, the diverging point is set at a position at which the distance between the primary path and the solid object increases by an amount larger than the reference lateral distance. This means that the diverging point is set at a position at which there is a space that allows the driver's own vehicle to move to the left or right while the driver's own vehicle travels along the primary path.

Therefore, even if the momentum of the driver's own vehicle is changed at the diverging point, a situation in which the vehicle enters the avoidance area (namely, collides with the solid object) can be prevented from occurring. Since the amount of change in the lateral distance is calculated at successive points along the direction of traveling away from the present location of the driver's own vehicle, if there are a plurality of points satisfying the condition as diverging points in the primary path, the diverging point is set at the point closest to the driver's own vehicle among these points. In other words, the diverging point is set at the point farthest from the avoidance area among the aforementioned points. Determining secondary paths based on such a diverging point leads to an increase in the number of available secondary paths that can be used as avoidance lines.

The "reference lateral distance" mentioned above is a value determined in such a way that the driver's own vehicle will not enter the avoidance area when the driver's own vehicle moves to the left or right with a change in the momentum of the vehicle at that point. The reference lateral distance may be set equal to the sum of the shortest lateral distance calculated in the past, error of measurement of a sensor used as the recognition means, and a margin. If the reference lateral distance as such is used to set the diverging point, it is possible to set an avoidance line along which the solid object can actually be avoided, even if there is a difference between the calculated value of the lateral distance and the actual lateral distance due to error of measurement of the sensor used as the recognition means.

The driving assistance system according to the present invention may be adapted to correct the position of the diverging point in the direction toward the driver's own vehicle in the primary paths, when the plurality of secondary paths do not include an avoidance line. In cases where the distance between the diverging point and the avoidance area is short, there is a possibility that the driver's own vehicle cannot avoid the avoidance area by changing the momentum of the driver's own vehicle at the diverging point. In other words, there is a possibility that the plurality of secondary paths along which the driver's own vehicle is predicted to travel if the momentum of the driver's own vehicle is changed at the diverging point do not include an avoidance line. If the position of the diverging point is corrected in the direction toward the driver's own vehicle in the primary paths, the probability that a plurality of secondary paths determined on the basis of the corrected diverging point include an avoidance line will be higher than that before the correction.

The driving assistance system according to the present invention may be adapted to determine, when correcting the position of the diverging point, the amount of correction of the position of the diverging point using as parameters the lateral distance and a maximum shift amount by which the driver's own vehicle can shift in the right or left direction by changing the momentum of the driver's own vehicle. The maximum shift amount mentioned above correlates with the maximum value of the steering angle that the driving assistance system can control. Therefore, the correction amount mentioned above may be calculated from the lateral distance d calculated immediately before the lateral distance at the divergent point before the correction is calculated and a trigonometric function of the maximum value θmax of the steering angle that the driving assistance system can control.

If the correction amount for the position of the diverging point is determined according to the above-described method, secondary paths including an avoidance line can be determined. If the secondary paths determined based on the diverging point after the correction do not include an avoidance line, the driving assistance system may set a diverging point in the middle of the secondary paths, determine a plurality of tertiary paths along which the driver's own vehicle can travel if the momentum of the driver's own vehicle is changed at that diverging point, and designate an avoidance line from among the tertiary paths.

The driving assistance system according to the present invention may be adapted to select as a candidate avoidance line a primary path along which the distance to the point of arrival at the avoidance area (which will be hereinafter referred to as the "arrival distance") is longer than a threshold from among the plurality of primary paths and to set a diverging point in the candidate avoidance line thus selected. The "threshold" mentioned above may be, for example, a value equal to either the maximum amount of change that the driving assistance system can control or the maximum amount of change that the occupants of the vehicle can allow, whichever is the smaller, plus a margin.

If the driver's own vehicle is to be guided to a path along which the vehicle can avoid a solid object in the middle of a primary path of which the arrival distance is short, it is necessary to change the momentum of the vehicle greatly. In consequence, the amount of change of the momentum needed to avoid the solid object may exceed the control range of the driving assistance system, and/or a high G-force may act on the occupants of the vehicle.

On the other hand, if the driver's own vehicle is to be guided to a path along which the vehicle can avoid a solid object in the middle of a primary path of which the arrival distance is long, the momentum of the vehicle can be changed within the control range of the driving assistance system, and the G-force acting on the occupants upon changing the momentum can be kept low. Therefore, if the diverging point is set in a candidate avoidance line of which the arrival distance is larger than the threshold, it is possible to set an avoidance line along which the solid object can be avoided while controlling the G-force acting on the occupants low. Moreover, this can make the load on the driving assistance system smaller than that in the case where divergent points are set in all of the plurality of primary paths.

When there are two or more primary paths of which the arrival distance is longer than the threshold, the driving assistance system for a vehicle according to the present invention may select the primary path of which the arrival distance is longest as a candidate avoidance line. If a candidate avoidance line is selected according to this method, it is possible to perform driving assistance by which a solid object can be avoided while minimizing the G-force acting on the occupants.

The driving assistance system for a vehicle according to the present invention may be adapted to select as a candidate avoidance line a primary path of which the arrival distance is longer than that of the adjacent primary path(s) by a predetermined margin or more. The "predetermined margin" mentioned above is a value determined in advance by an adaptation process based on, for example, experiments. In the case where a diverging point is set according to this method, the load on the driving system can be made smaller than that in the case where diverging points are set for a plurality of primary paths.

If all the secondary paths along which the driver's own vehicle can travel if the momentum of the vehicle is changed at the diverging point are to be determined, the load on the driving assistance system may be increased, and the time taken until the avoidance line is designated may become longer.

In view of this, the driving assistance system for a vehicle according to the present invention may be adapted not to perform search for secondary paths on the left or right side of the candidate avoidance line when the difference between the arrival distance of a secondary path along which the driver's own vehicle can travel by changing the steering angle of the vehicle to the left or right in the middle of the candidate avoidance line and the arrival distance of the candidate avoidance line is smaller than a reference value.

Effects of the Invention

The present invention enables a driving assistance system that performs driving assistance for avoiding a solid object existing in the course of the driver's own vehicle to perform effective driving assistance while keeping the load on the driving assistance system low.

THE BEST MODE FOR CARRYING OUT THE INVENTION

In the following, a specific embodiment of the present invention will be described with reference to the drawings. Here, an exemplary case in which the present invention is applied to a system that recognizes a track for a driver's own vehicle and/or a solid object that can be an obstacle and performs driving assistance for preventing deviation from the recognized track and/or avoiding a collision with the solid object. The construction of the embodiment described in the following is an illustrative mode of the present invention and not intended to limit the present invention.

Figure 1:
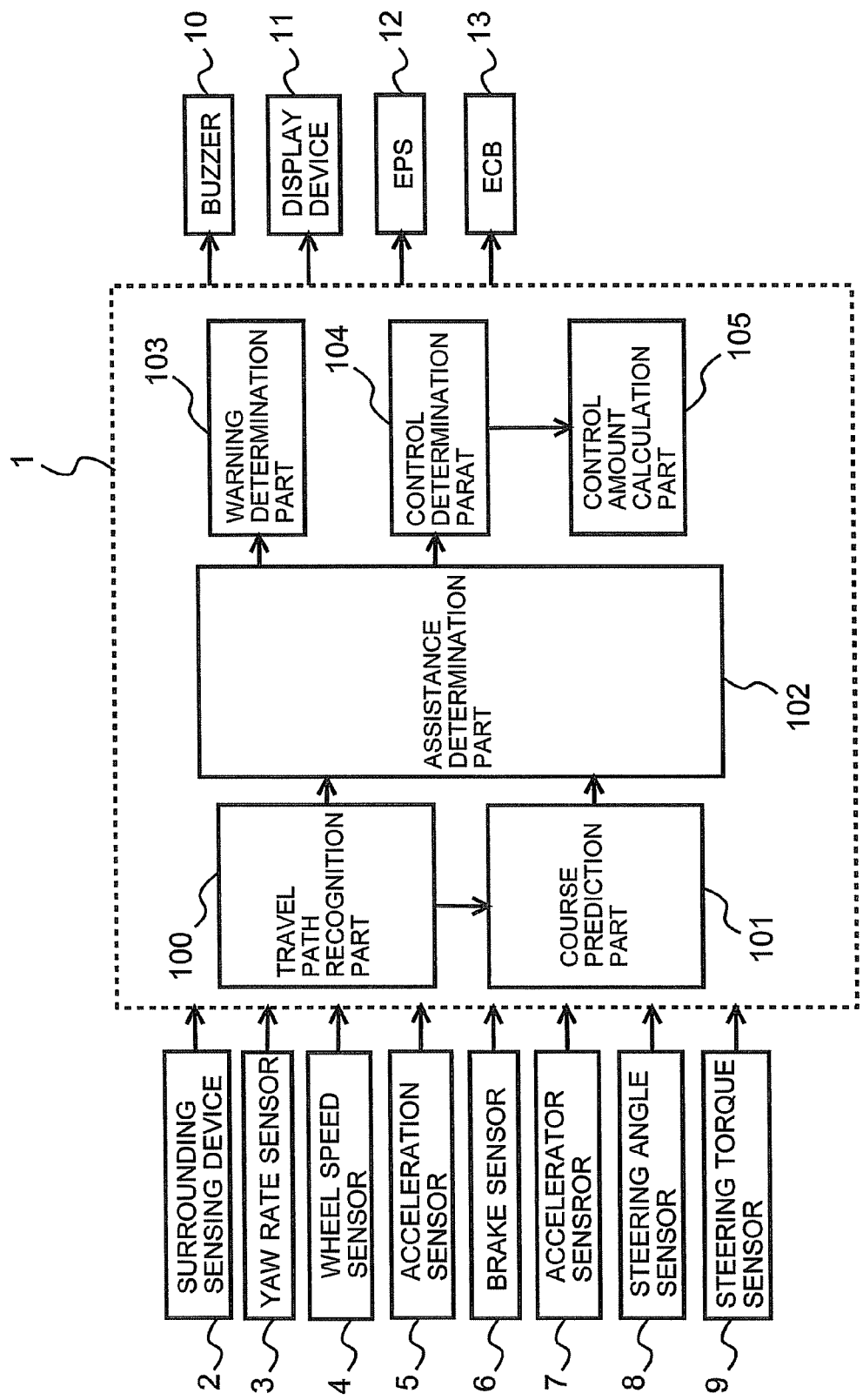
FIG. 1 is a diagram showing the configuration of a driving assistance system for a vehicle according to the present invention.

FIG. 1 is a block diagram showing, on a function-by-function basis, the configuration of a driving assistance system for a vehicle to which the present invention is applied. As shown in FIG. 1, the vehicle is equipped with a control unit (ECU) 1 for driving assistance.

The ECU 1 is an electronic control unit having a CPU, a ROM, a RAM, a backup RAM, and I/O interface etc. The ECU 1 is electrically connected with various sensors such as a surrounding sensing device 2, a yaw rate sensor 3, a wheel speed sensor 4, an acceleration sensor 5, a brake sensor 6, an accelerator sensor 7, a steering angle sensor 8, and a steering torque sensor 9. Signals output from these sensors are input to the ECU 1.

The surrounding sensing device 2 includes, for example, at least one measurement device selected from among an LIDAR (Laser Imaging Detection And Ranging), an LRF (Laser Range Finder), and a stereo camera. The surrounding sensing device 2 acquires, by detection, information about a relative position (e.g. relative distance and/or relative angle) of the driver's own vehicle and a solid object existing in the surrounding of the vehicle. The surrounding sensing device 2 corresponds to the recognition means according to the present invention.

The yaw rate sensor 3 is mounted, for example, on the body of the driver's own vehicle and outputs an electrical signal correlating with the yaw rate $\gamma$ of the driver's own vehicle. The wheel speed sensor 4 is attached to a wheel of the vehicle and outputs an electrical signal correlating with the running speed of the vehicle (vehicle speed V). The acceleration sensor 5 outputs electrical signals correlating with the acceleration of the driver's own vehicle in the front-rear direction (longitudinal acceleration) and the acceleration of the driver's own vehicle in the left-right direction (lateral acceleration).

The brake sensor 6 is attached, for example, to a brake pedal provided in the cabin and outputs an electrical signal correlating with the operation torque of (or depression force acting on) the brake pedal. The accelerator sensor 7 is attached, for example, to an accelerator pedal provided in the cabin and outputs an electrical signal correlating with the operation torque of (or depression force acting on) the accelerator pedal. The steering angle sensor 8 is attached, for example, to a steering rod connected with a steering wheel provided in the cabin and outputs an electrical signal correlating with the rotational angle of the steering wheel (steering angle) relative to a neutral position. The steering torque sensor 9 is attached to the steering rod and outputs an electrical signal correlating with the toque (steering torque) exerted on the steering wheel.

The ECU 1 is also connected with various devices such as a buzzer 10, a display device 11, an electric power steering (EPS) 12, and an electronically controlled brake (ECB) 13. These devices are electrically controlled by the ECU 1.

The buzzer 10 is provided, for example, in the cabin to provide warning sound or the like. The display device 11 is provided, for example, in the cabin to display various messages and warning light. The electric power steering (EPS) 12 is a device that assists the steering torque of the steering wheel utilizing torque generated by an electric motor. The electronically controlled brake (ECB) 13 is a device that electrically adjusts the operation oil pressure (brake oil pressure) of friction brakes provided for the respective wheels.

To control various devices using signals output from the above-described various sensors, the ECU 1 has the following functions. The ECU 1 has a track recognition part 100, a course prediction part 101, an assistance determination part 102, a warning determination part 103, a control determination part 104, and a control amount calculation part 105.

The track recognition part 100 generates information about the road (track) on which the driver's own vehicle will travel, on the basis of information output from the surrounding sensing device 2. For example, the track recognition part 100 generates grid coordinates representing the positions of solid objects that can be obstacles to the driver's own vehicle (e.g. curbstones extending on the side of the lane, guard rails, grooves, walls, poles, and other vehicles) in a two dimensional grid map having an origin at the position of the driver's own vehicle and information about the posture of the driver's own vehicle relative to such solid objects and the lane boundaries (e.g. the distance and yaw angle relative to them).

Figure 2:
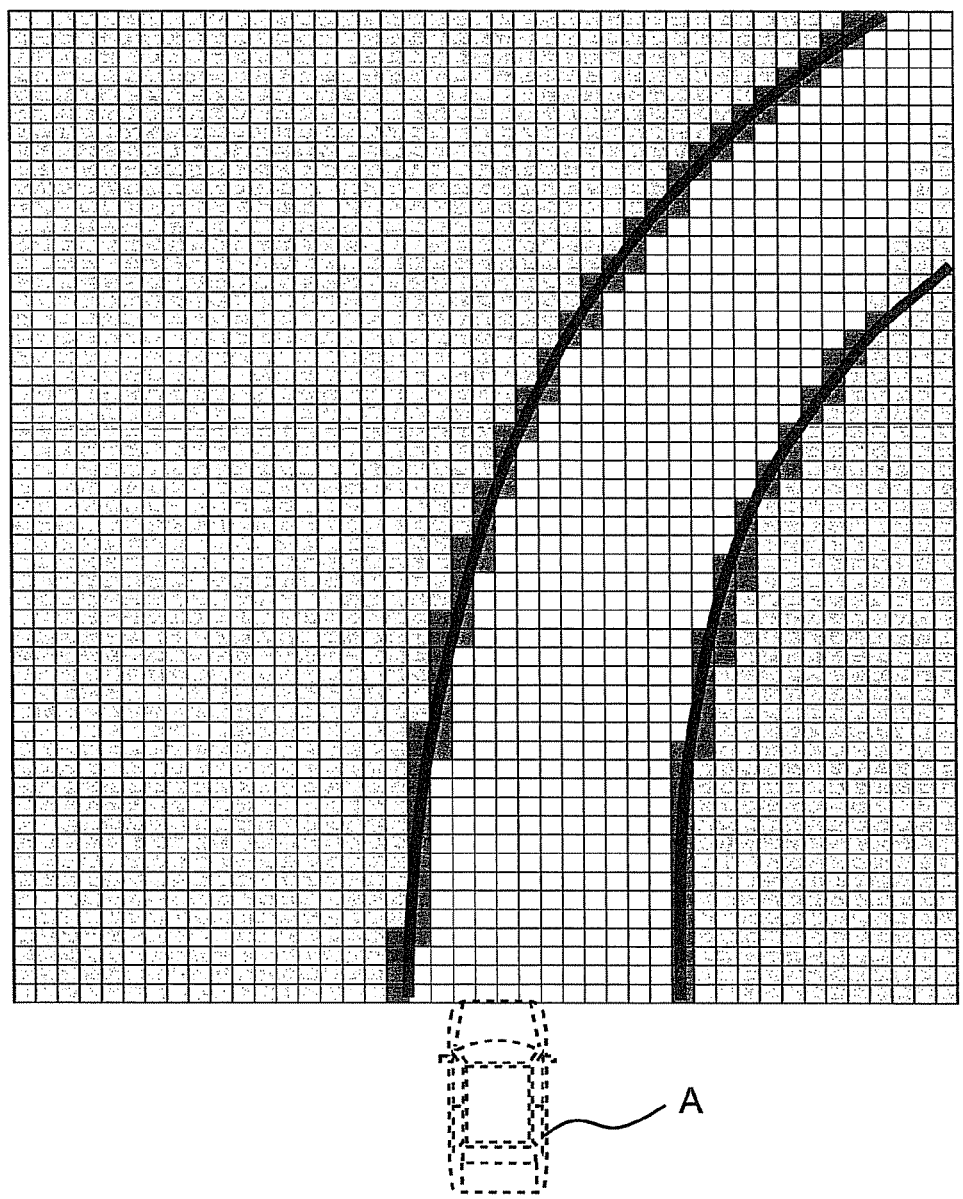
FIG. 2 is a diagram illustrating a method of generating a grid map.

A method of generating the grid map will be described with reference to FIG. 2. FIG. 2 is a grid map in a case where the road curves to the right. The two solid lines in FIG. 2 represent the edges of the road. These lines are added for the purpose of illustration of the method of generating the grid map.

The track recognition part 100 designates the cells in the grid map located at the positions at which the solid objects detected by the surrounding sensing device 2 exist as avoidance areas (the dark gray filled areas in FIG. 2). Then, the track recognition part 100 designates the cells located on virtual lines connecting the solid objects detected by the surrounding sensing device 2 and the driver's own vehicle as safe areas (the non-filled areas in FIG. 2). If no solid object is detected on virtual lines connecting the drivers own vehicle and positions delimiting the range of sensing by the surrounding sensing device 2 (e.g. edges of the grid map), the track recognition part 100 designates the cells located on these virtual lines as unknown areas. Furthermore, the track recognition part 100 designates the cells at blind positions hidden by the solid objects (i.e. cells located behind the solid objects as seen from the driver's own vehicle) as unknown areas (the light gray filled areas in FIG. 2).

Figure 3:
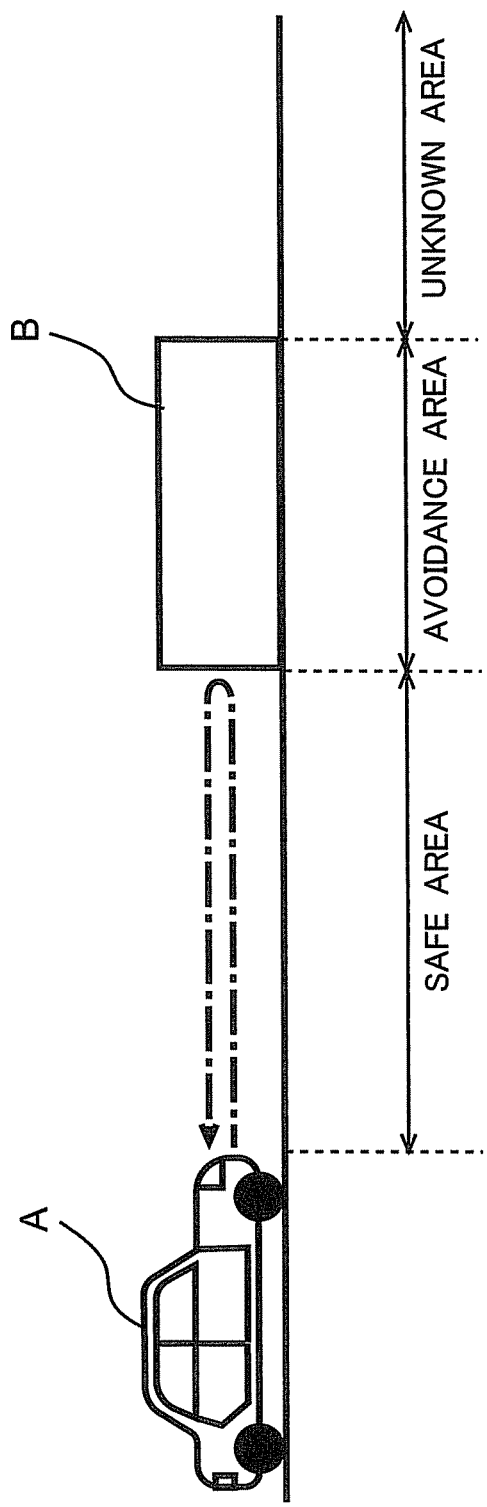
FIG. 3 is a diagram illustrating a method of setting an avoidance area and a safe area.

In the initial state of the grid map, all the cells are designated as unknown areas. When the surrounding sensing device 2 recognizes a solid object as shown in FIG. 3 (for example, when radar waves emitted from the surrounding sensing device 2 return to it as reflected waves), the track recognition part 100 changes the status of the cells at the position of a solid object B from unknown areas to avoidance areas and changes the status of the cells on the virtual lines connecting the avoidance areas and the driver's own vehicle A from unknown areas to safe areas.

When the grid map is generated according to this method, an area(s) in which a solid object(s) may possibly exist will not be designated as a safe area(s), even in cases where the surrounding sensing device 2 fails to detect a solid object or in cases where there are areas that cannot be sensed by the surrounding sensing device 2. The track recognition part 100 corresponds to the setting means according to the present invention.

The course prediction part 101 predicts a route (or course) which the driver's own vehicle will follow if the vehicle runs while maintaining the present momentum. Specifically, the course prediction part 101 calculates the turning radius R on the assumption that the driver's own vehicle will run while maintaining the present vehicle speed V and the yaw rate $\gamma$ and determines the course on the basis of the turning radius R thus calculated and the width of the driver's own vehicle. The turning radius R can be calculated by dividing the vehicle speed V by the yaw rate $\gamma$.

Figure 4:
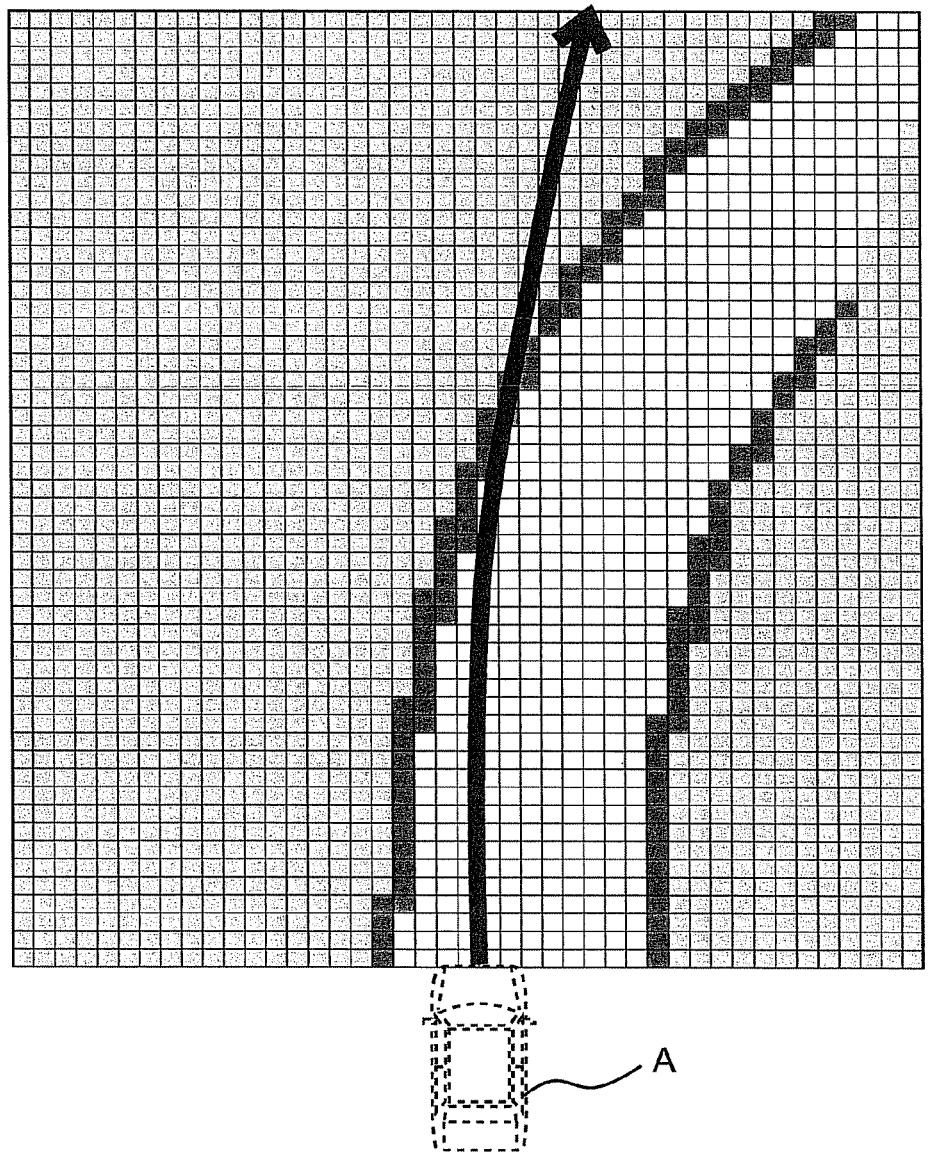
FIG. 4 is a diagram showing an exemplary case in which a solid object (or avoidance area) exists in the course of the driver's own vehicle.
Figure 5:
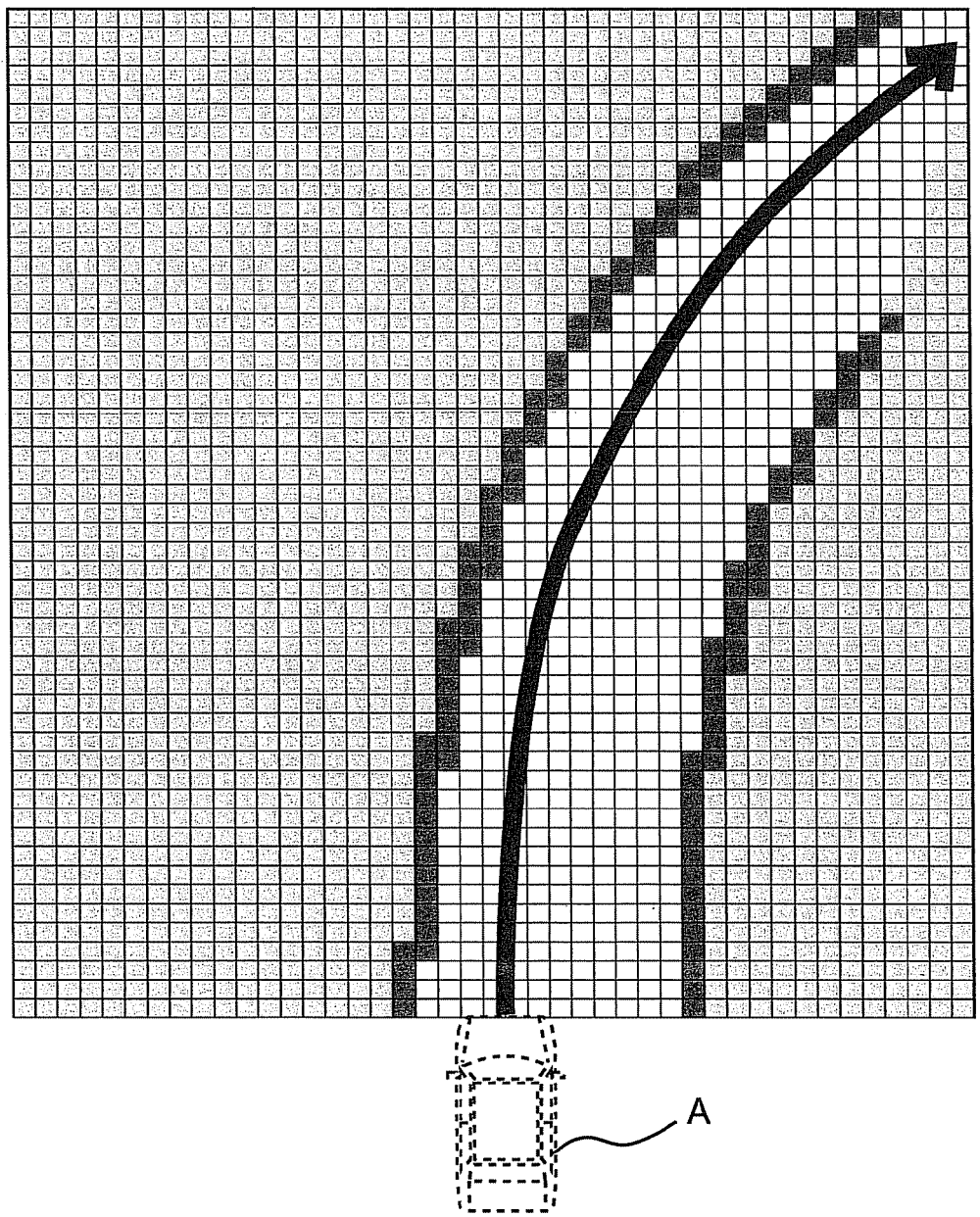
FIG. 5 is a diagram showing an exemplary case in which no solid object (or avoidance area) exists in the course of the driver's own vehicle.

The assistance determination part 102 determines whether or not driving assistance is to be performed, on the basis of the grid map generated by the track recognition part 100 and the course predicted by the course prediction part 101. Specifically, the assistance determination part 102 determines whether or not the course of the driver's own vehicle crosses an avoidance area in the grid map. In this process, if as shown in FIG. 4, the course of the driver's own vehicle A (the solid arrow in FIG. 4) crosses an avoidance area, the assistance determination part 102 determines that it is necessary to perform driving assistance. On the other hand, if as shown in FIG. 5, the course of the driver's own vehicle A (the solid arrow in FIG. 5) crosses no avoidance area, the assistance determination part 102 determines that it is not necessary to perform driving assistance.

The warning determination part 103 warns the driver by buzzing of the buzzer 10 and/or display of a warning message or warning light on the display device 11, when it is determined by the assistance determination part 102 that it is necessary to perform driving assistance. For example, the warning determination part 103 may cause the buzzer 10 to buzz and/or cause the display device 11 to display the warning message or warning light immediately at the time when it is determined by the assistance determination part 102 that it is necessary to perform driving assistance. Alternatively, the warning determination part 103 may cause the buzzer 10 to buzz and/or cause the display device 11 to display the warning message or warning light immediately at the time when the distance between the driver's own vehicle and a solid object becomes equal to or shorter than a predetermined distance. Alternatively, the warning determination part 103 may calculate the time taken for the driver's own vehicle A to reach the solid object B along the path in which the distance between the driver's own vehicle and the solid object is largest and cause the buzzer 10 to buzz and/or cause the display device 11 to display the warning message or warning light at the time when the result of the calculation becomes equal to or shorter than a predetermined time.

The predetermined distance and the predetermined time mentioned above may be changed responsive to a signal output from the yaw rate sensor 3 and/or a signal output from the wheel speed sensor 4. For example, the predetermined distance or the predetermined time may be set longer when the vehicle speed is high than when it is low. The predetermined distance or the predetermined time may be set longer when the yaw rate is high than when it is low.

The way of warning the driver is not limited to buzz of the buzzer 10 or display of a warning message or warning light on the display device 11, but other methods such as intermittently changing the fastening torque of the sheet belt may be employed.

When it is determined by the assistance determination part 102 that it is necessary to perform driving assistance, the control determination part 104 determines the timing for automatically performing a driving operation needed to avoid a collision of the driver's own vehicle with a solid object. (This operation will be hereinafter referred to as "avoidance operation".)

Specifically, the control determination part 104 may be configured to synchronize the time at which the avoidance operation is to be performed with the time when the distance between the driver's own vehicle and the solid object becomes equal to or smaller than a predetermined distance. Alternatively, the control determination part 104 may be configured to calculate the time taken for the driver's own vehicle to reach the solid object, and to synchronize the time at which the avoidance operation is to be performed with the time when the result of the calculation becomes equal to or shorter than a predetermined time. The "avoidance operation" mentioned here includes an operation of changing the steering angle of wheels using the electric power steering (EPS) 12, and an operation of changing the braking force exerted on wheels using the electronically controlled brake (EBC) 13 may also be employed additionally.

The predetermined distance and the predetermined time referred to by the control determination part 104 may be varied in relation to the vehicle speed and the yaw rate, as with the predetermined distance and the predetermined time referred to by the warning determination part 103 described above. The predetermined distance and the predetermined time referred to by the control determination part 104 should be set equal to or shorter than the predetermined distance and the predetermined time referred to by the warning determination part 103 described above.

When the timing for performing the avoidance operation is determined by the control determination part 104, the control amount calculation part 105 calculates control amounts for the electric power steering (EPS) 12 and the electronically controlled brake (ECB) 13 and controls the electric power steering (EPS) 12 and the electronically controlled brake (ECB) 13 in accordance with the control amounts thus calculated and the timing for performing the avoidance operation determined by the control determination part 104.

Figure 6:
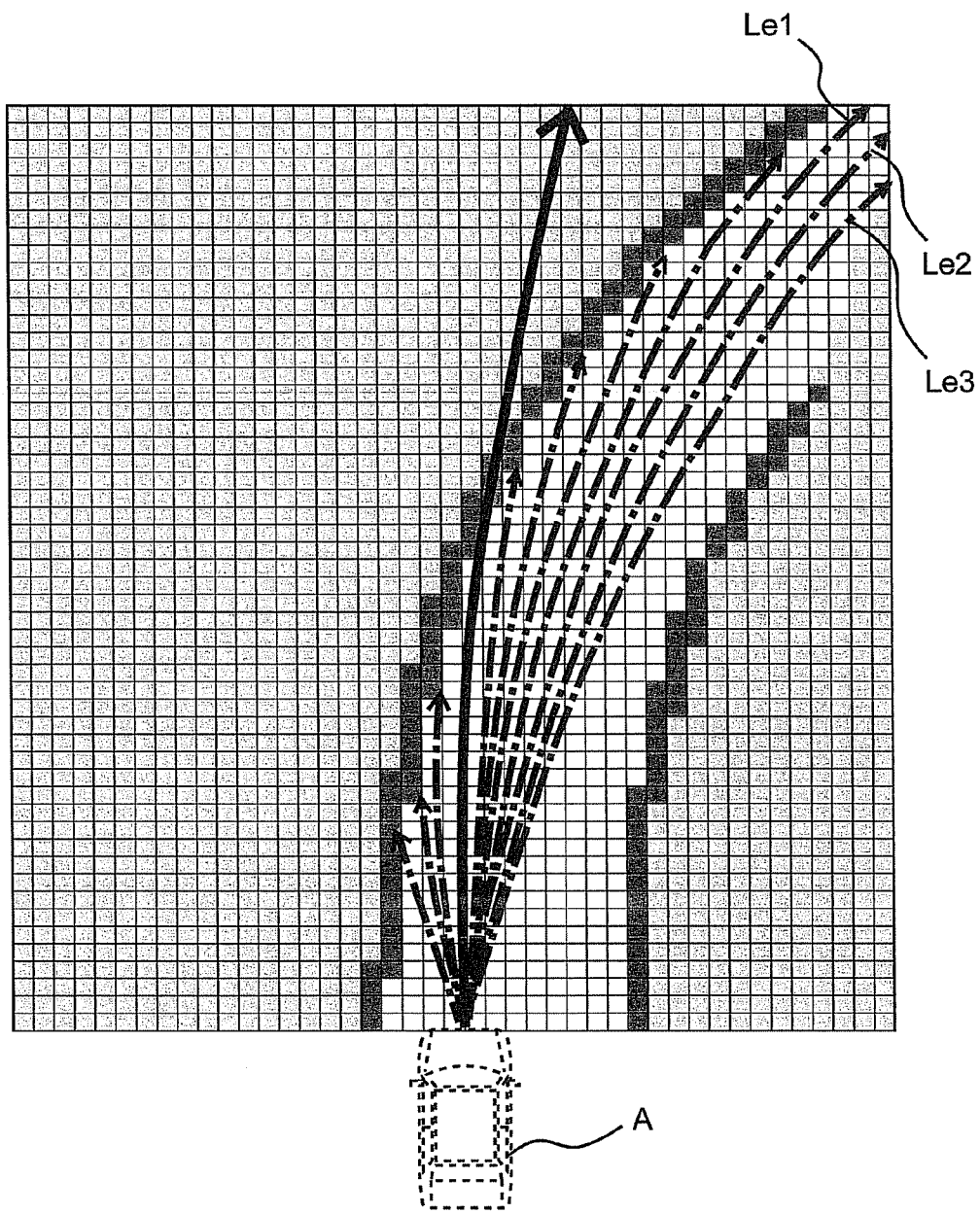
FIG. 6 is a diagram illustrating a method of designating an avoidance line.

Specifically, the control amount calculation part 105 designates an avoidance line along which a collision of the driver's own vehicle with the solid object can be avoided. The method of specifying the avoidance line will be described with reference to FIGS. 6 to 13. The control amount calculation part 105 determines a plurality of primary paths (represented by the dot-and-dash arrows in FIG. 6) along which the driver's own vehicle is predicted to travel if the steering angle of the vehicle is varied in predetermined angular increments: The "predetermined angular increment" mentioned here is equal to the smallest angle by which the ECU 1 can control the steering angle.

The control amount calculation part 105 selects, from among aforementioned primary paths, a primary path that crosses no avoidance area and no unknown area (paths Le1, Le2, and Le3 in FIG. 6) as the avoidance line. When there are a plurality of primary paths that cross no avoidance area and no unknown area, the control amount calculation part 105 may select the primary path that can be followed with the smallest change in the steering angle from the steering angle at the present time (that is, in the case shown in FIG. 6, path Le1).

Figure 7:
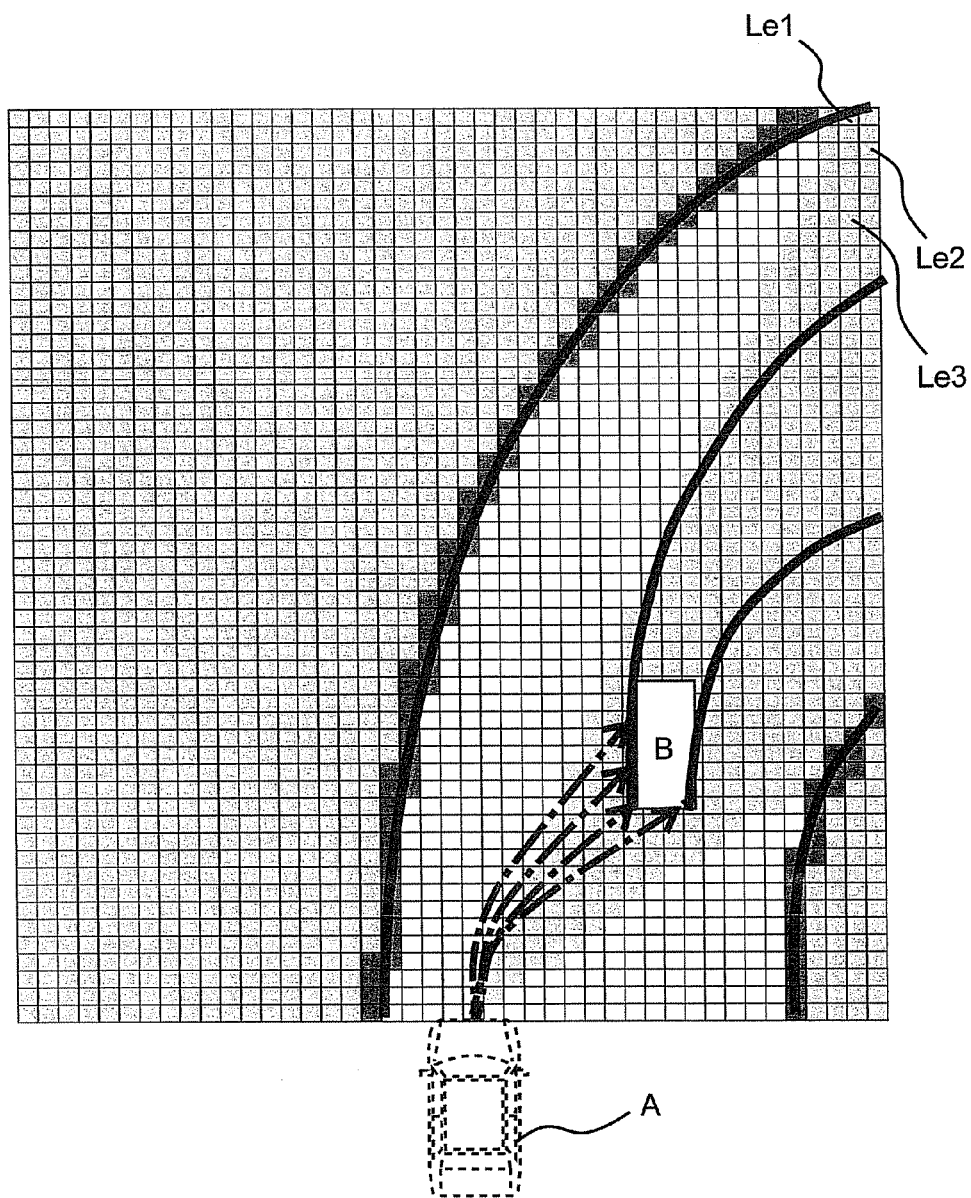
FIG. 7 is a diagram showing exemplary paths excluded from options of the avoidance line.

In the case where a travel cost is set for each of the cells in the grid map, the control amount calculation part 105 may be adapted to calculate the sum of the travel costs of all the cells that each primary path crosses (total travel cost) for all of the aforementioned plurality of primary paths and to select the primary path for which the total travel cost thus calculated is the smallest. In this process, the control amount calculation part 105 should exclude primary paths of which the length through the unknown area (or the number of times of crossing cells of unknown areas) is larger than a predetermined value from the options of the avoidance line. For example, as shown in FIG. 7, if a solid object B existing at a fork of a road fails to be recognized, the primary paths leading to a collision with the solid object B (i.e. the paths represented by the dot-and-dash arrows in FIG. 7) are excluded from the options of the avoidance line. In the case where there are a plurality of primary paths for which the total travel cost is smallest, the control amount calculation part 105 may select the primary path that can be followed with the smallest change in the steering angle from the steering angle at the present time.

The "travel cost" mentioned above is a value set in accordance with the degree of risk in traveling through a cell. For example, the travel cost of the cells of avoidance area is set larger than the travel cost of the cells of unknown area, and the travel cost of the cells of unknown area is set larger than travel cost of the cells of safe area. The travel cost of the cells of unknown area may be varied in accordance with their size. For example, the travel cost may be set larger for a larger cell than for a smaller cell in the unknown area. This is because the probability of the existence of a solid object in a cell is larger in a larger cell than in a smaller cell. The travel cost as described above may be set by the track recognition part 100 in generating the grid map.

There may be a case where as avoidance lines for avoiding a solid object (first solid object) existing in the course of the driver's own vehicle, there is no other choice than paths that may lead to a collision with another solid object (second solid object). For example, as shown in FIG. 8, there may be a case where all the primary paths along which a first solid object B1 existing in the course of the driver's own vehicle A (represented by the solid arrow in FIG. 8) can be avoided (i.e. the paths represented by the solid arrows L14, L15, and L16 in FIG. 8) do not allow avoidance of a second solid object B2.

In the above-described case, the control amount calculation part 105 is adapted to determine avoidance lines along which the first and second solid objects B1, B2 can be avoided by changing the steering angle of the driver's own vehicle again in the middle of the primary paths. In this process, if a search for avoidance lines is performed for all of the plurality of primary paths, an excessively high computational load may be placed on the driving assistance system and the time taken to determine the avoidance lines may become long.

In view of this, the control amount calculation part 105 is adapted to select a primary path of which the arrival distance is longer than a threshold and longer than the arrival distance(s) of the adjacent primary path(s) by a predetermined margin or more and to perform a search for an avoidance line only for the selected primary path (candidate avoidance line).

Figure 8:
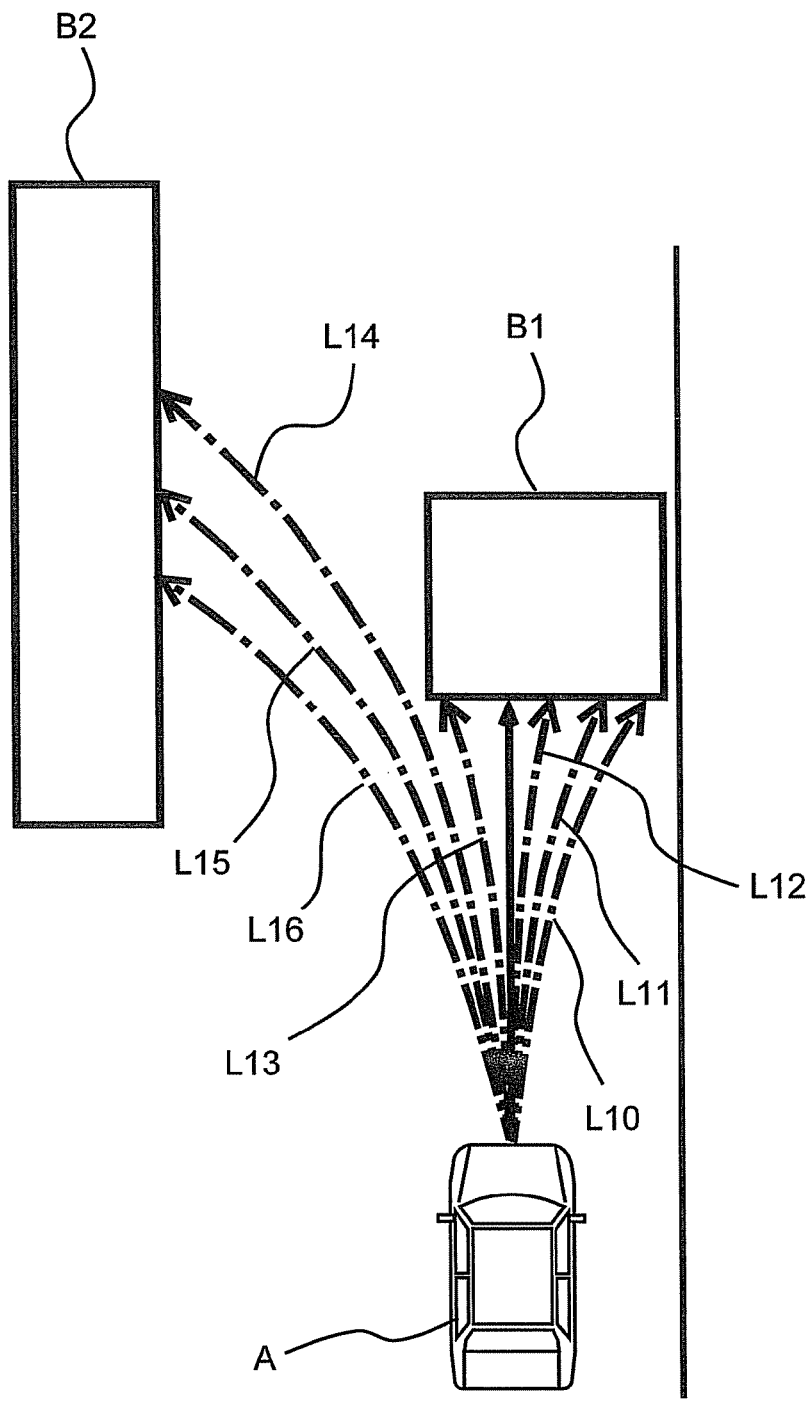
FIG. 8 is a diagram illustrating an exemplary case in which the primary paths do not include an avoidance line.

In the case where the above-described condition is set, for example, primary paths L10, L11, and L12 in FIG. 8 are excluded from the options of the candidate avoidance line, because the differences between the arrival distances of the primary paths L10, L11, and L12 in FIG. 8 and the arrival distances of the respective adjacent primary paths are smaller than the predetermined margin, and the arrival distances of primary paths L10, L11, and L12 are shorter than the threshold. Primary path L13 in FIG. 8 is excluded from the options of the candidate avoidance line, because the arrival distance thereof is shorter than the threshold. Primary path L15 in FIG. 8 is excluded from the options of the candidate avoidance line, because the arrival distance thereof is shorter than that of the adjacent primary path L14, though not shorter than the threshold. Primary path L16 in FIG. 8 is excluded from the options of the candidate avoidance line, because the arrival distance thereof is shorter than that of the adjacent primary path L15, though not shorter than the threshold. Thus, primary path L14 is selected as the candidate avoidance line, in the case illustrated in FIG. 8.

Figure 9:
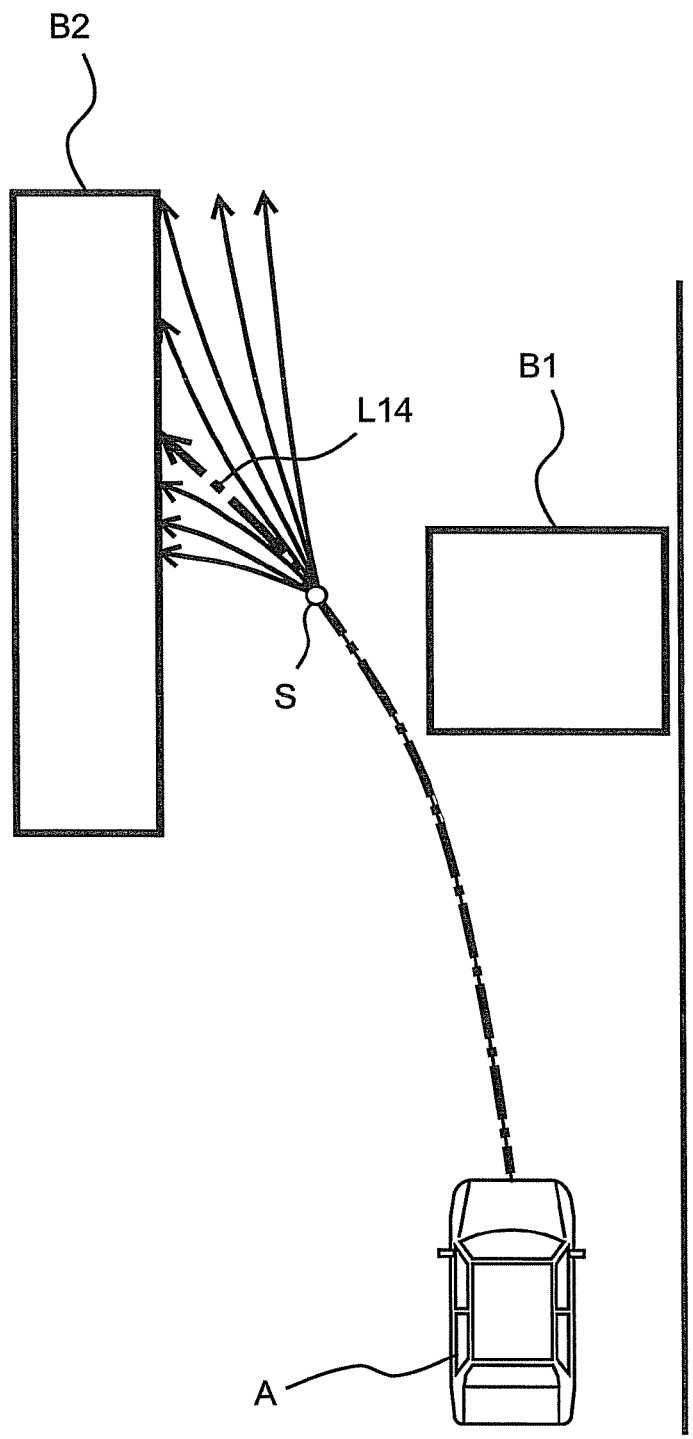
FIG. 9 is a diagram illustrating a method of determining secondary paths starting from a point in the middle of a primary path.

Thereafter, as shown in FIG. 9, the control amount calculation part 105 determines secondary paths (represented by solid arrows in FIG. 9) that starts from a diverging point (point S in FIG. 9) set in the middle of the candidate avoidance line and along which the driver's own vehicle is predicted to travel when the steering angle is varied in the left and right directions in predetermined angular increments. Then, the control amount calculation part 105 designates an avoidance line from among the plurality of secondary paths. The method of this designation is the same as the method of designating avoidance lines from among the plurality of primary paths. Specifically, the control amount calculation part 105 selects, from among the secondary paths, a path that crosses no avoidance area and no unknown area as the avoidance line. In the case where a travel cost is set for each of the cells in the grid map, the control amount calculation part 105 may be adapted to select the secondary path for which the total travel cost thus calculated is smallest among the aforementioned secondary paths. In this process, the control amount calculation part 105 should exclude secondary paths of which the length through the unknown area (or the number of times of crossing cells of unknown area) is larger than a predetermined value from the options of the avoidance line. In the case where there are a plurality of secondary paths that pass no avoidance area and no unknown area or where there are a plurality of secondary paths for which the total travel cost is smallest, the control amount calculation part 105 may select the secondary path that can be followed with the smallest change in the steering angle from the steering angle for the candidate avoidance line.

If the process for determining whether or not the avoidance area can be avoided and the process of calculating the total travel cost are performed for all of the plurality of secondary paths, an excessively high computational load may be placed on the driving assistance system and the time taken to determine the avoidance lines may become long.

Figure 10:
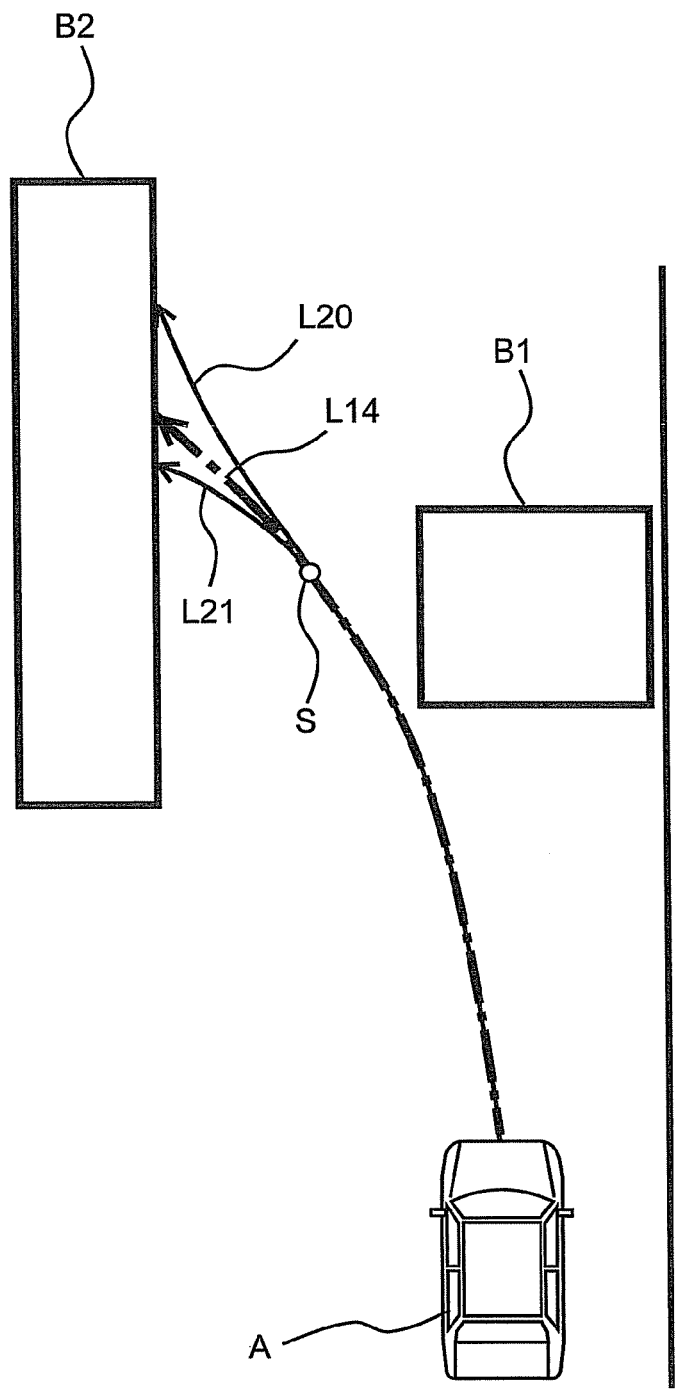
FIG. 10 is a diagram illustrating a method of limiting the range in which secondary paths are set.

In view of this, the control amount calculation part 105 may be adapted to determine secondary paths in a limited manner only on one of the left and right sides of the candidate avoidance line. Specifically, as shown in FIG. 10, the control amount calculation part 105 determines a secondary path L20 along which the driver's own vehicle is predicted to travel if the steering angle is changed to the right by a predetermined angle at the diverging point and a secondary path L21 along which the driver's own vehicle is predicted to travel if the steering angle is changed to the left by a predetermined angle at the diverging point. Then, the control amount calculation part 105 calculates an extended amount of the arrival distance by subtracting the arrival distance of the candidate avoidance line (i.e. the length of the candidate avoidance line from the driver's own vehicle to the solid object) from the arrival distance of each of the secondary paths L20 and L21 (equal to the sum of the length of the candidate avoidance line from the driver's own vehicle to the diverging point and the length of the secondary path between the diverging point and the solid object). In other words, the control amount calculation part 105 calculates an increase (or extended amount) in the arrival distance of each of the secondary paths in relation to the arrival distance of the candidate avoidance line. When the extended amount in one of the secondary paths L20 and L21 is smaller than a threshold, the control amount calculation part 105 may do away with a search for secondary paths on the side same as this secondary path.

For example, if the extended amount in the secondary path L20 is smaller than the threshold, the control amount calculation part 105 performs a search for secondary paths only in a range on the left side of the candidate avoidance line. On the other hand, if the extended amount in the secondary path L21 is smaller than the threshold, the control amount calculation part 105 performs a search for secondary paths only in a range on the right side of the candidate avoidance line. Such a limitation of the range of search for secondary paths reduces the computational load on the driving assistance system, leading to a reduction in the time taken until the avoidance line is determined. If the extended amounts in both the secondary lines L20 and L21 are smaller than the threshold, the control amount calculation part 105 may search for secondary paths on both the right and left sides of the candidate avoidance line or only on the side same as the secondary path whose arrival distance is longer.

Figure 11:
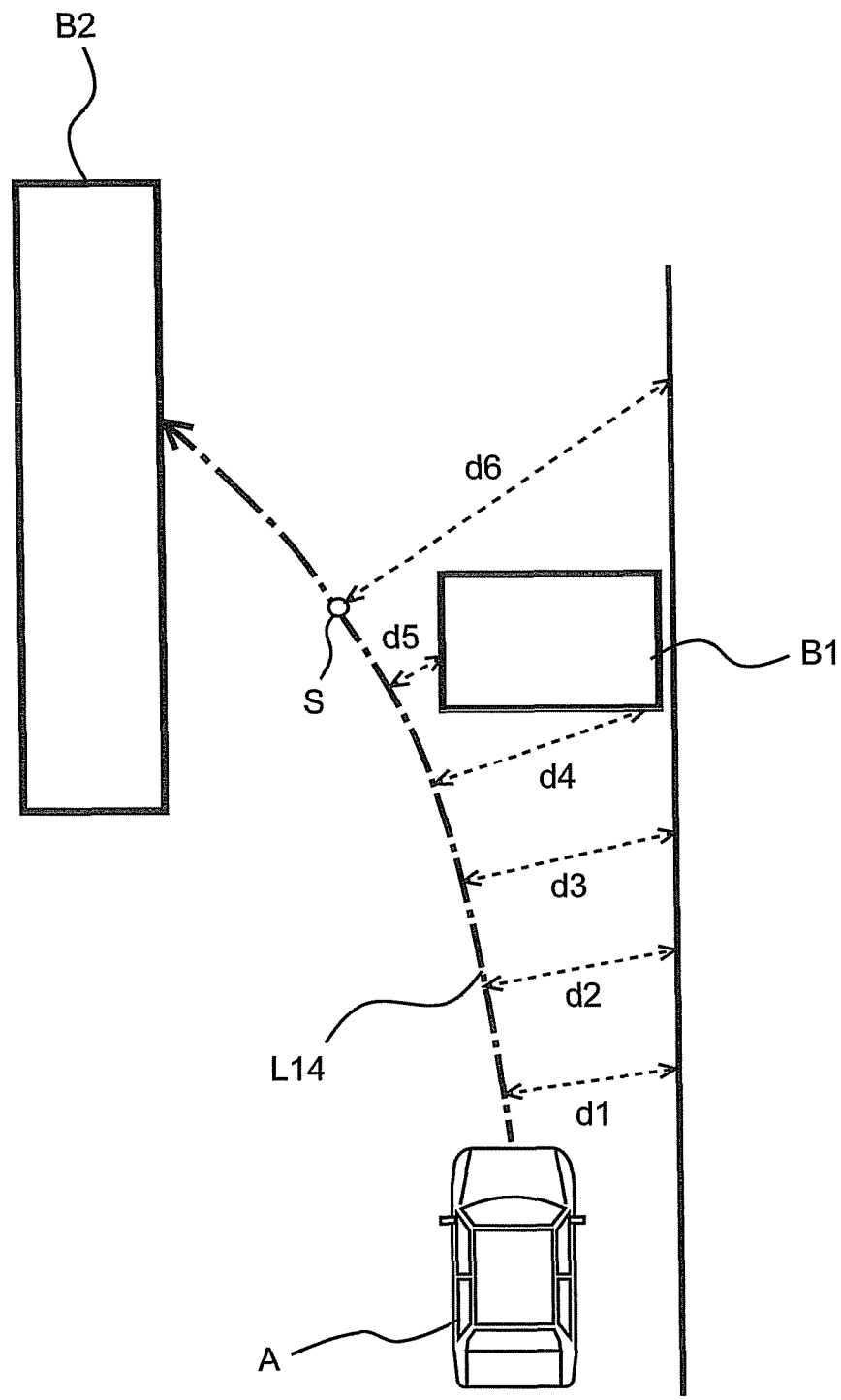
FIG. 11 is a diagram illustrating a method of setting a diverging point.
Figure 12:
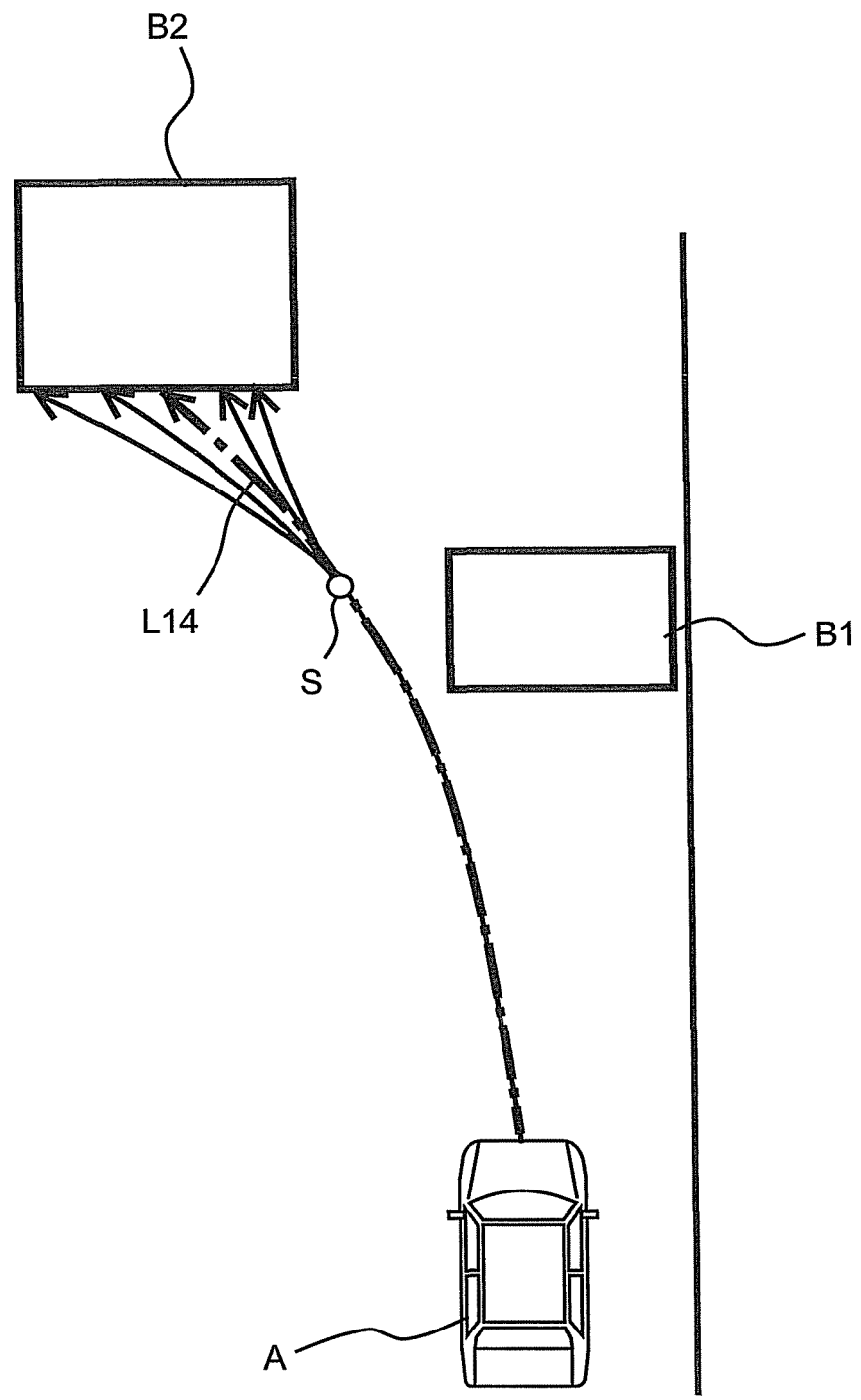
FIG. 12 shows an exemplary case in which the secondary paths determined based on the diverging point do not include an avoidance line.

The aforementioned diverging point may be set at a plurality of points arranged at regular intervals on the candidate avoidance line. However, as the number of the diverging points is increased, the computational load on the driving assistance system becomes higher, because it is necessary to search for secondary paths at every diverging point. As shown in FIG. 11, the control amount calculation part 105 is adapted to calculate lateral distances (d1, d2, d3, d4, d5, and d6 in FIG. 11) at points arranged at regular intervals (e.g. points spaced by a constant distance or a distance which the driver's own vehicle travels in a constant time) successively in order in the direction away from the driver's own vehicle. Here, the lateral distance refers to the distance between the candidate avoidance line and a solid object along the lateral direction of the avoidance line. Then, the control amount calculation part 105 sets a diverging point at a point at which the lateral distance is longer than the lateral distance at the immediately preceding point by a length not smaller than a specific length. The "specific length" mentioned here is a length equal to the sum of the shortest lateral distance among the plurality of lateral distances having been already calculated, error of measurement of the surrounding sensing device 2, and a margin. For example, at the time when lateral distance d6 is calculated as shown in FIG. 11, the specific length is the sum of the shortest distance among lateral distances d1, d2, d3, d4, and d5 (e.g. d5 in FIG. 11), error of measurement of the surrounding sensing device 2, and a margin. In the case where solid objects exist on both the left and right sides of the candidate avoidance line, the control amount calculation part 105 uses either the lateral distance on the right side of the candidate avoidance line or the lateral distance on the left side of the candidate avoidance line, whichever is shorter, as the aforementioned lateral distance.

Figure 13:
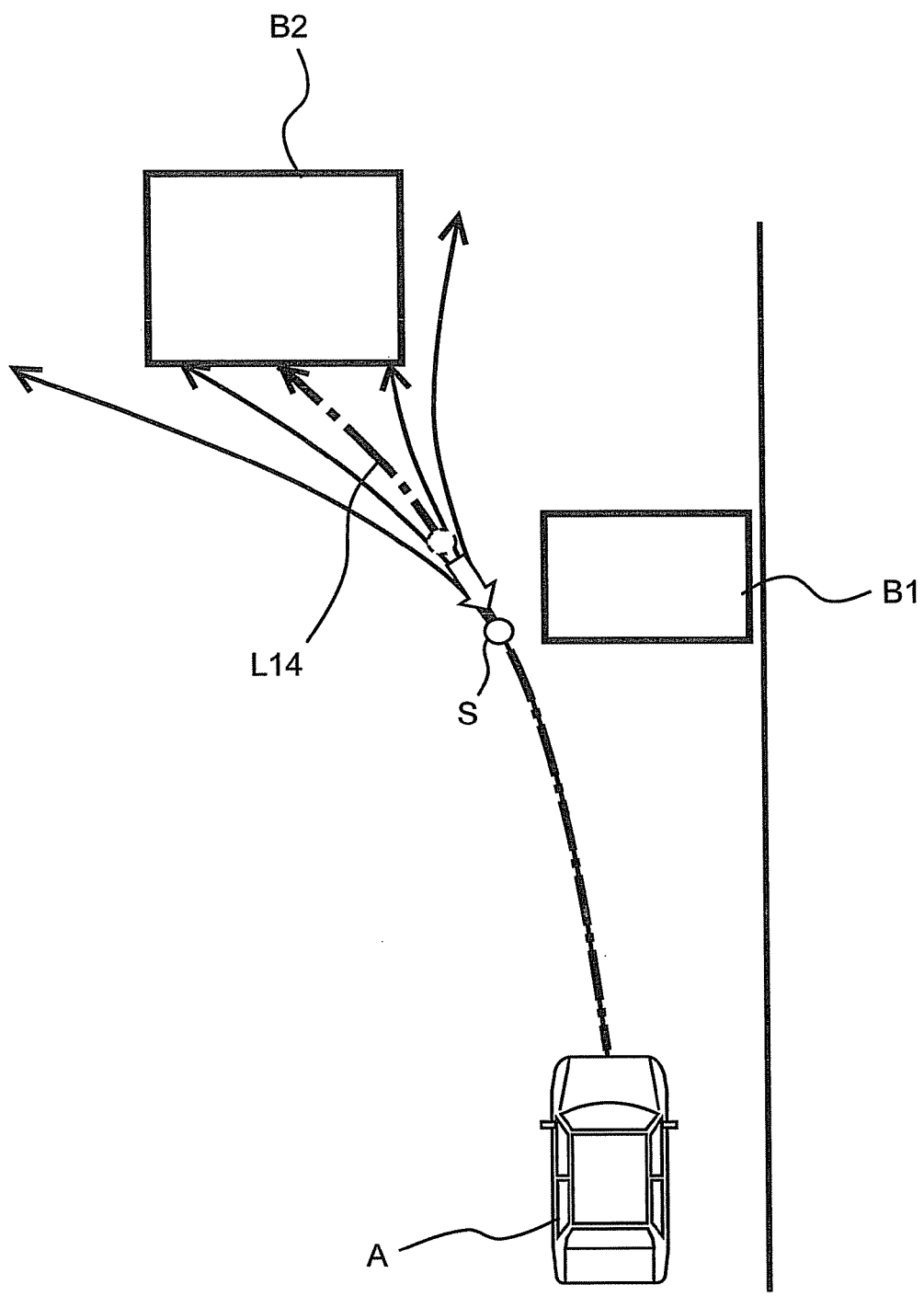
FIG. 13 is a diagram showing exemplary secondary paths determined in a case where the position of the diverging point is shifted toward the driver's own vehicle.

In the case where a plurality of secondary paths are determined on the basis of the above-described diverging point, there is a possibility that there is no secondary path along which a second solid object B2 can be avoided, among the secondary paths. When this is the case, the control amount calculation part 105 may shift the position of the diverging point toward the driver's own vehicle as illustrated in FIG. 13. The amount of shift $\Delta I$ in this case can be calculated by the following equation:

$$\Delta I = d/\tan \theta \max.$$

In the above equation, d is the lateral distance calculated immediately before the calculation of the lateral distance at the diverging point (e.g. d5 in FIG. 11), and $\theta$ max is the maximum value of the steering angle that the driving assistance system can control.

If the diverging point is shifted toward the driver's own vehicle in the above-described manner, it is possible to determine secondary paths along which the second solid object 82 can be avoided as shown in FIG. 13. Consequently, it is possible to set an avoidance line along which the first solid object B1 and the second solid object B2 can be avoided. If the plurality of secondary paths do not include an avoidance line, the control amount calculation part 105 may select a candidate avoidance line from among the plurality of secondary paths and determine a plurality of tertiary paths starting from a point in the middle of the selected candidate avoidance line. In other words, the control amount calculation part 105 may execute a process of selecting a candidate avoidance line, a process of setting a diverging point, and a process of determining paths with changes in the momentum of the driver's own vehicle at the diverging point repeatedly until an avoidance line is found.

The above-described control amount calculation part 105 corresponds to the assistance means according to the present invention.

With the ECU 1 configured as described above, driving assistance that guides the driver's own vehicle to an area in which the presence/absence of a solid object is unknown or driving assistance that guides the driver's own vehicle to an area in which the driver's own vehicle will collide with a solid object other than a solid object existing in the course of the driver's own vehicle can be prevented from being performed as long as possible with the increase in the computational load on the ECU 1 being controlled.

Figure 14:
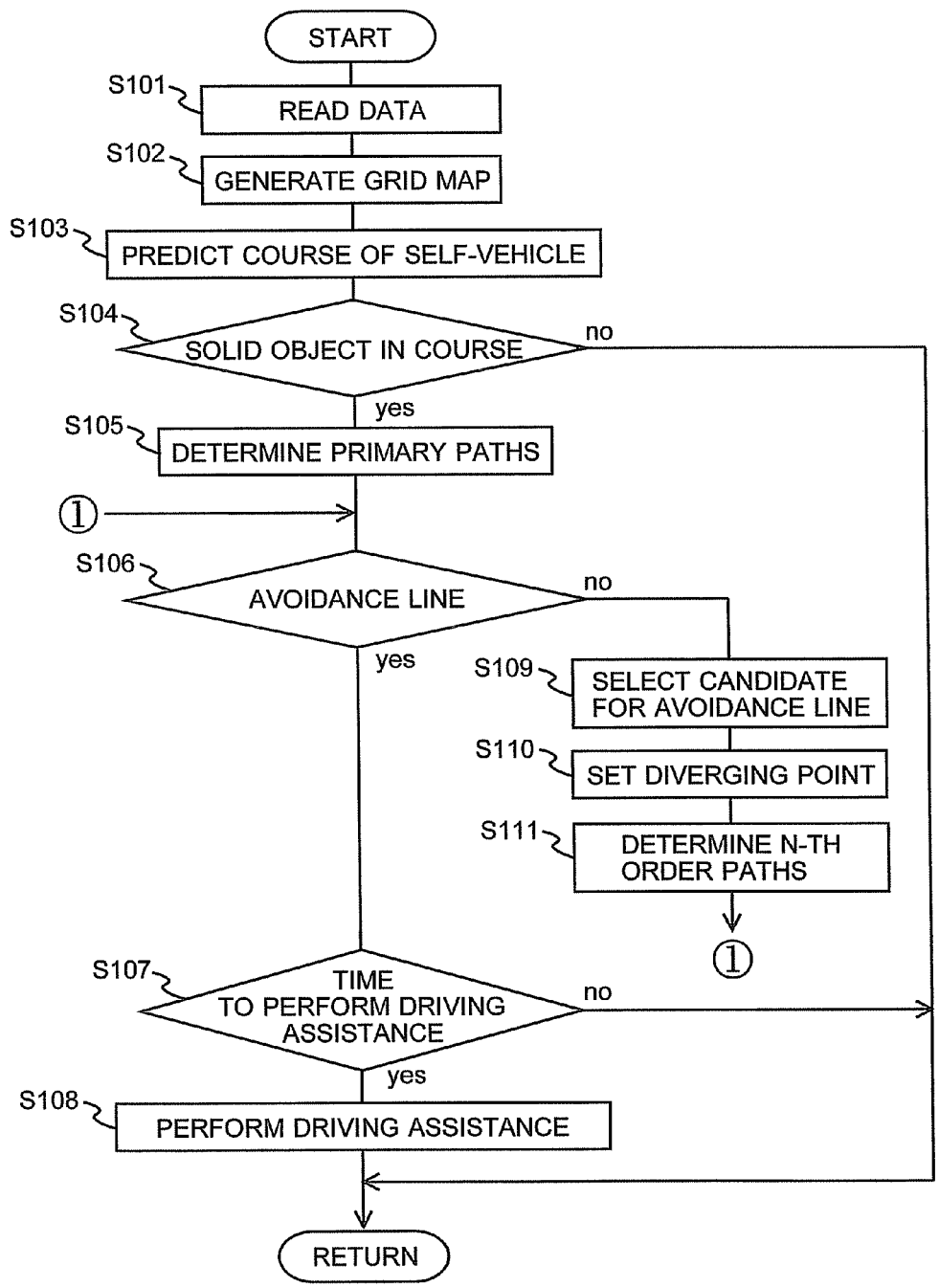
FIG. 14 is a flow chart of the process of executing driving assistance.

In the following, a process of executing driving assistance in this embodiment will be described with reference to FIG. 14. FIG. 14 is a flow chart of a processing routine, which is stored in, for example, the ROM of the ECU 1 and executed repeatedly by the ECU 1.

In the processing routine shown in FIG. 14, first in step S101, the ECU 1 reads a signal output from the surrounding sensing device 2, a signal output from the yaw rate sensor 3 (yaw rate $\gamma$), a signal output from the wheel speed sensor 4 (vehicle speed V), and a signal output from the steering angle sensor 10 (steering angle $\theta$).

In step S102, the ECU 1 generates a grid map on the basis of the signal output from the surrounding sensing device 2. Specifically, the ECU 1 operates a grid map in which the status of all the cells is set to be unknown area to change the status of the cells at the position at which a solid object exists into avoidance area and to change the status of the cells located between the solid object and the driver's own vehicle into safe area. The ECU 1 may further set a travel cost for each cell.

In step S103, the ECU 1 predicts (or computes) the course of the driver's own vehicle on the basis of the yaw rate $\gamma$ and the vehicle speed V.

In step S104, the ECU 1 determines whether or not a solid object exists in the course of the driver's own vehicle on the basis of the grid map generated in the above step S102 and the course predicted in the above step S103. If the determination in step S104 is negative, the ECU 1 once terminates the execution of this routine. On the other hand, if the determination in step S104 is affirmative, the ECU 1 proceeds to step S105.

In step S105, the ECU 1 determines primary paths. Specifically, the ECU 1 computes a plurality of primary paths along which the driver's own vehicle is predicted to travel when the steering angle $\theta$ read in the above step S101 is changed to the left and right in predetermined angular increments. Furthermore, the ECU 1 may calculate the total travel cost for each of the plurality of primary paths.

In step S106, the ECU 1 determines whether or not the plurality of primary paths obtained in the above step S105 include an avoidance line along which the avoidance areas and the unknown areas can be avoided. In the case where a travel cost is set for each of the cells in the grid map, the ECU 1 determines, in step S106, whether or not the plurality of primary paths include a primary path for which the total travel cost is not larger than an allowable limit value. The "allowable limit value" mentioned above is, for example, the possible maximum value of the total travel cost for primary paths that do not cross the avoidance areas and of which the length through the unknown area (or the number of times of crossing cells of unknown area) is not larger than an upper limit value.

If the determination in step S106 is affirmative, the ECU 1 proceeds to step S107, where it determines whether or not it is the time to perform driving assistance. Specifically, the ECU 1 determines whether or not the distance between the driver's own vehicle and a solid object is equal to or shorter than a predetermined distance. Alternatively, the ECU 1 determines whether or not the time taken for the driver's own vehicle to reach the solid object is equal to or shorter than a predetermined time. If the determination in step S107 is negative, the ECU 1 once terminates the execution of this routine. On the other hand, if the determination in step S107 is affirmative, the ECU 1 proceeds to step S108.

In step S108, the ECU 1 controls the power steering (EPS) 12 in such a way as to cause the driver's own vehicle to travel along the avoidance line. More specifically, the ECU 1 controls the electric power steering (EPS) 12 in such a way that the steering angle $\theta$ becomes equal to the steering angle adapted to the avoidance line. In the case where there are a plurality of primary paths that cross no avoidance area and no unknown area, or in the case where there are a plurality of primary paths of which the total travel cost is not larger than the allowable limit value, the ECU 1 selects the primary path that can be followed with the smallest change in the steering angle from the steering angle $\theta$ at the present time and controls the electric power steering (EPS) 12 according to the steering angle adapted to the selected avoidance line.

If the determination in step S106 is negative, the ECU 1 proceeds to step S109. In step S109, the ECU 1 selects a candidate avoidance line from among the plurality of primary paths. Specifically, the ECU 1 selects, as a candidate avoidance line, a primary path of which the arrival distance is longer than a threshold and longer than the arrival distance of the adjacent primary path by a predetermined margin or more, from among the plurality of primary paths.

In step S110, the ECU 1 sets a diverging point on the candidate avoidance line selected in the above step S109. Specifically, the ECU 1 calculates a lateral distance at points on the candidate avoidance line arranged at regular intervals in order in the direction away from the driver's own vehicle. Then, the ECU 1 sets a diverging point at a point at which the lateral distance is longer than the lateral distance at the immediately preceding point by a length not smaller than a specific length.

In step S111, the ECU 1 determines a plurality of secondary paths on the basis of the diverging point set in the above step S110. Specifically, the ECU 1 determines a plurality of secondary paths along which the driver's own vehicle is predicted to travel when the steering angle is varied in the left and right directions in predetermined angular increments at the aforementioned diverging point. In this process, the ECU 1 may determine secondary paths in a limited manner only on the right or left side of the candidate avoidance line. After executing the process of step S111, the ECU 1 executes the process of step S106 and subsequent steps again.

Driving assistance performed in the above-described manner enables the driver's own vehicle to be prevented from colliding with a solid object even when recognition by the surrounding sensing device 2 is unsuccessful. Furthermore, in the case where there are a plurality of solid objects around the driver's own vehicle, as is the case when there is a possibility that the driver's own vehicle collides with a solid object after avoiding another solid object existing in the course of the driver's own vehicle, it is possible to set a complex avoidance line along which these solid objects can be avoided, while controlling the increase in the computational load on the ECU 1. In consequence, the safety can be improved by driving assistance.

DESCRIPTION OF THE REFERENCE NUMERALS AND SYMBOLS

1: ECU
2: surrounding sensing device
3: yaw rate sensor
4: wheel speed sensor
5: acceleration sensor
6: brake sensor
7: accelerator sensor
8: steering angle sensor
9: steering torque sensor
10: buzzer
11: display device
12: electric power steering (EPS)
13: electronically controlled brake (ECB)
100: track recognition part
101: course prediction part
102: assistance determination part
103: warning determination part
104: control determination part
105: control amount calculation part

The invention claimed is:

1. A driving assistance system for a vehicle comprising:
recognition unit for recognizing a solid object existing in the surrounding of a driver's own vehicle and generating information about a relative position of the solid object and the driver's own vehicle;
setting unit for setting a grid map representing relative positions of the present location of the driver's own vehicle, an avoidance area, a safe area, and an unknown area on the basis of the information generated by said recognition unit, the avoidance area being an area in which a solid object exists, the safe area being an area in which no solid object exists, and the unknown area being an area in which it is not known whether a solid object exists or not; and
assistance unit for, when the course of the driver's own vehicle crosses said avoidance area in the grid map set by said unit, determining a plurality of primary paths, designating an avoidance line from among the plurality of primary paths, and changing the momentum of the driver's own vehicle in such a way that the driver's own vehicle travels along the designated avoidance line, the primary paths being paths along which the driver's own vehicle can travel by changing the momentum of the driver's own vehicle, and the avoidance line being a path along which the avoidance area can be avoided,
wherein when said plurality of primary paths do not include an avoidance line, said assistance unit sets a diverging point in the middle of said primary paths at which the momentum of the driver's own vehicle is to be changed again, determines a plurality of secondary paths, and designates an avoidance line from among the plurality of secondary paths, the secondary paths being paths along which the driver's own vehicle can travel by changing the momentum of the driver's own vehicle at said diverging point.

2. A driving assistance system for a vehicle according to claim 1, wherein said assistance unit determines the position of the diverging point in said primary paths using a lateral distance as a parameter, the lateral distance being the distance between said primary paths and an avoidance area existing on either the left or right side of said primary paths.

3. A driving assistance system for a vehicle according to claim 2, wherein said assistance unit calculates the amount of change in the lateral distance at successive points along a traveling direction of the driver's own vehicle and sets the diverging point at a point at which said amount of change is equal to or larger than a predetermined reference lateral distance.

4. A driving assistance system for a vehicle according to claim 3, wherein when said plurality of secondary paths do not include an avoidance line, the assistance unit corrects the position of the diverging point in the direction toward the driver's own vehicle in said primary paths.

5. A driving assistance system for a vehicle according to claim 4, wherein said assistance unit determines the amount of correction of the position of the diverging point using as parameters said lateral distance and a maximum shift amount by which the driver's own vehicle can shift in the right or left direction by changing the momentum of the driver's own vehicle.

* * * * *